United States Patent [19]

Cotic

[11] Patent Number: 4,907,686
[45] Date of Patent: Mar. 13, 1990

[54] AUTOMATIC HIGH SPEED TIE PLATE REORIENTING MECHANISM

[75] Inventor: Dennis J. Cotic, Waukesha, Wis.

[73] Assignee: Oak Industries, Inc., San Diego, Calif.

[21] Appl. No.: 224,486

[22] Filed: Jul. 26, 1988

[51] Int. Cl.⁴ .............................................. B65G 11/20
[52] U.S. Cl. ...................................... 193/45; 198/399; 198/409; 198/403; 193/48
[58] Field of Search ............... 198/394, 395, 399, 402, 198/403, 404, 409; 193/45, 44, 47, 48, 40, 35 A

[56] References Cited

U.S. PATENT DOCUMENTS

| | | | |
|---|---|---|---|
| 3,380,570 | 4/1968 | Jordan, III | 198/403 |
| 3,426,882 | 2/1969 | Korth | 198/404 |
| 3,433,966 | 3/1969 | Letch et al. | 250/223 |
| 3,666,066 | 5/1972 | Coakes | 193/47 |
| 3,882,785 | 5/1975 | Rowe | 104/16 |
| 3,943,858 | 3/1976 | Dieringer et al. | 104/16 |
| 3,986,604 | 10/1976 | Siryj | 198/395 |
| 4,178,671 | 12/1979 | Luttig | 29/429 |
| 4,241,663 | 12/1980 | Lund et al. | 104/16 |
| 4,280,613 | 7/1981 | Stewart | 198/406 |
| 4,393,784 | 7/1983 | Theurer | 104/2 |
| 4,484,675 | 11/1984 | Doherty et al. | 198/403 X |
| 4,727,989 | 3/1988 | Cotic et al. | 198/395 X |
| 4,793,463 | 12/1988 | Kane | 198/403 |

FOREIGN PATENT DOCUMENTS

| | | | |
|---|---|---|---|
| 433627 | 9/1926 | Fed. Rep. of Germany | 104/16 |
| 0144598 | 10/1980 | Netherlands | 193/45 |
| 308954 | 3/1969 | Sweden | 310/198 |
| 386049 | 10/1973 | U.S.S.R. | 104/16 |
| 509398 | 4/1976 | U.S.S.R. | 313/398 |
| 0637237 | 12/1978 | U.S.S.R. | 193/44 |
| 644897 | 1/1979 | U.S.S.R. | 104/16 |
| 652257 | 3/1979 | U.S.S.R. | 104/16 |
| 765445 | 9/1980 | U.S.S.R. | 104/16 |

OTHER PUBLICATIONS

"An Attraction for OTM", Railway Track and Structures, Mar., 1986, pp. 29-31.

Primary Examiner—Robert J. Spar
Assistant Examiner—D. Glenn Dayoan
Attorney, Agent, or Firm—Welsh & Katz, Ltd.

[57] ABSTRACT

An electromechanical manipulation system for reorienting the position of sensed conveyed articles such as rail tie plates upon an inclined conveyor surface includes first and second transverse openings in the inclined conveyor surface, the second opening being located closer to the upper conveyor end than the first opening, a stop member located in the first opening and adapted for reciprocal vertical movement therein to obstruct the descent of improperly oriented individual plates down the conveyor surface. Once the descent of the plate has been stopped, a reciprocal flipper member located in the second and opening of the conveyor is adapted to impart an impulse to an end of the immobilized plate to cause the plate to be inverted and thus properly oriented upon the conveying surface. Once inverted, the flipper member and the stop member quickly retract to permit the properly oriented plate to continue its descent and also to prepare for the descent of the next plate.

31 Claims, 3 Drawing Sheets

U.S. Patent    Mar. 13, 1990    Sheet 1 of 3    4,907,686
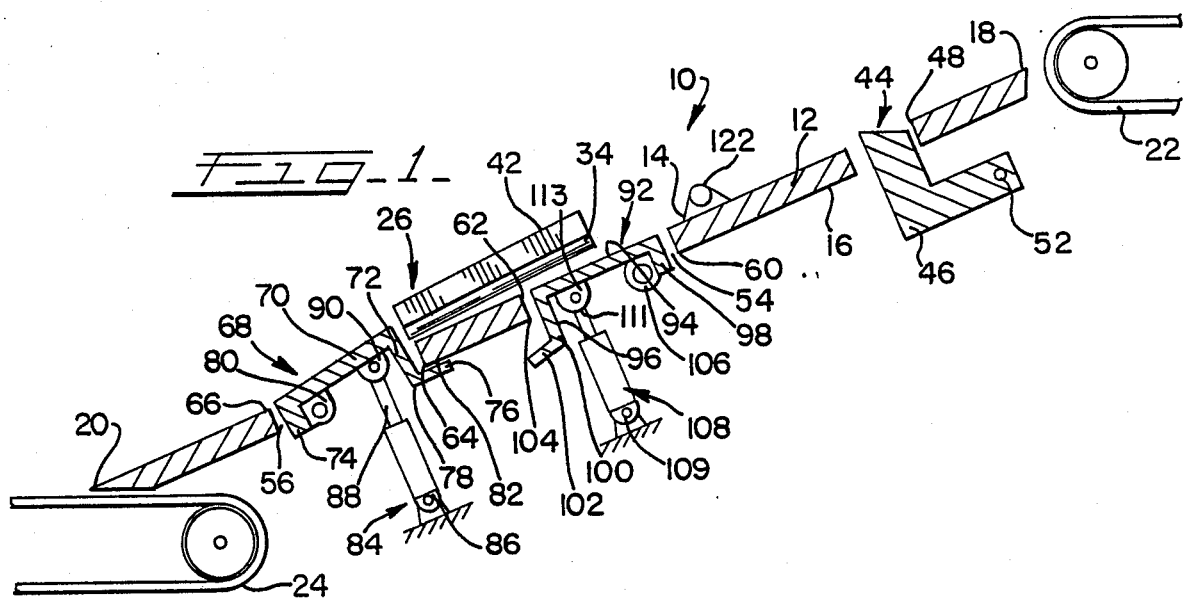
FIG-1.
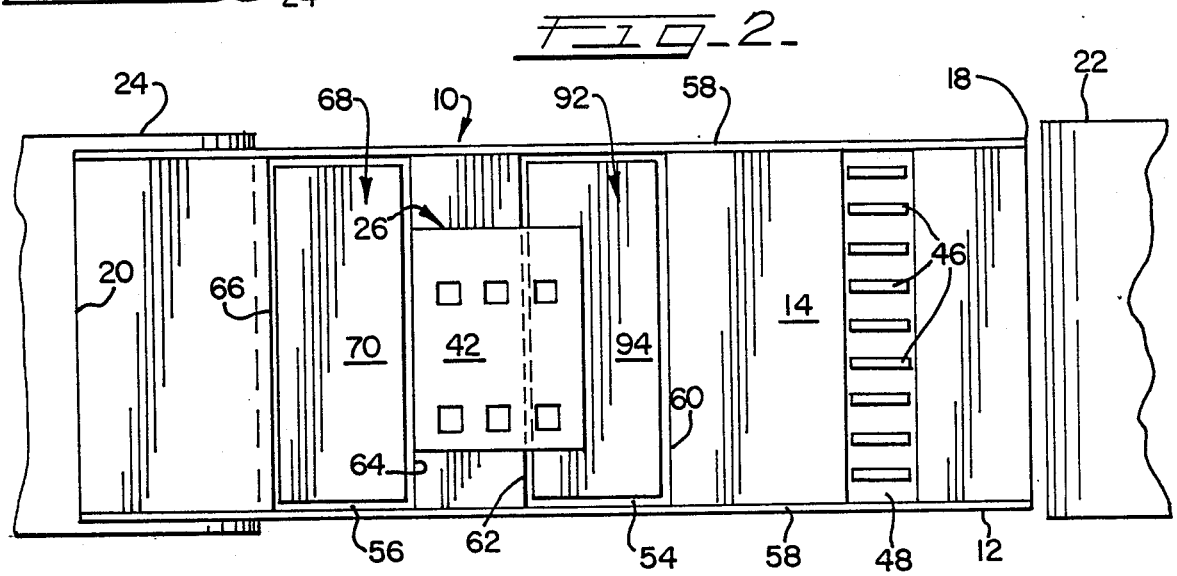
FIG-2.
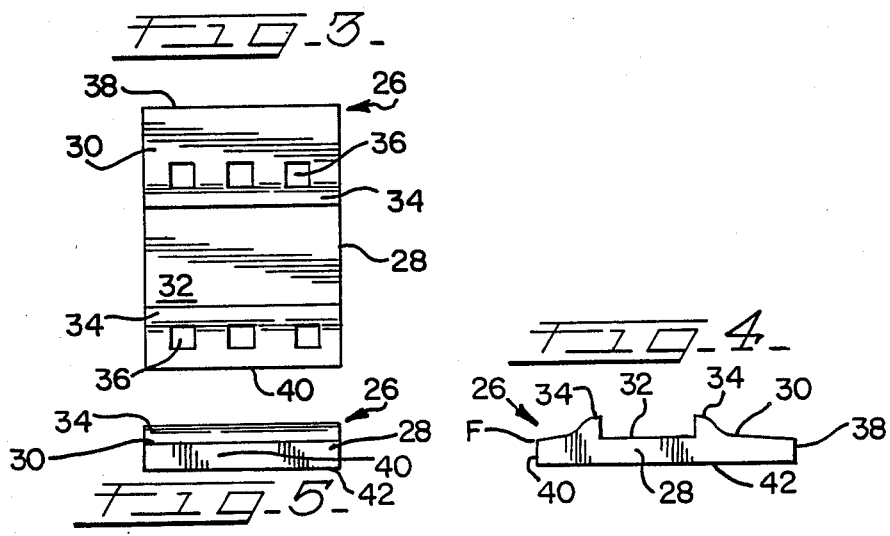
FIG-3.
FIG-4.
FIG-5.

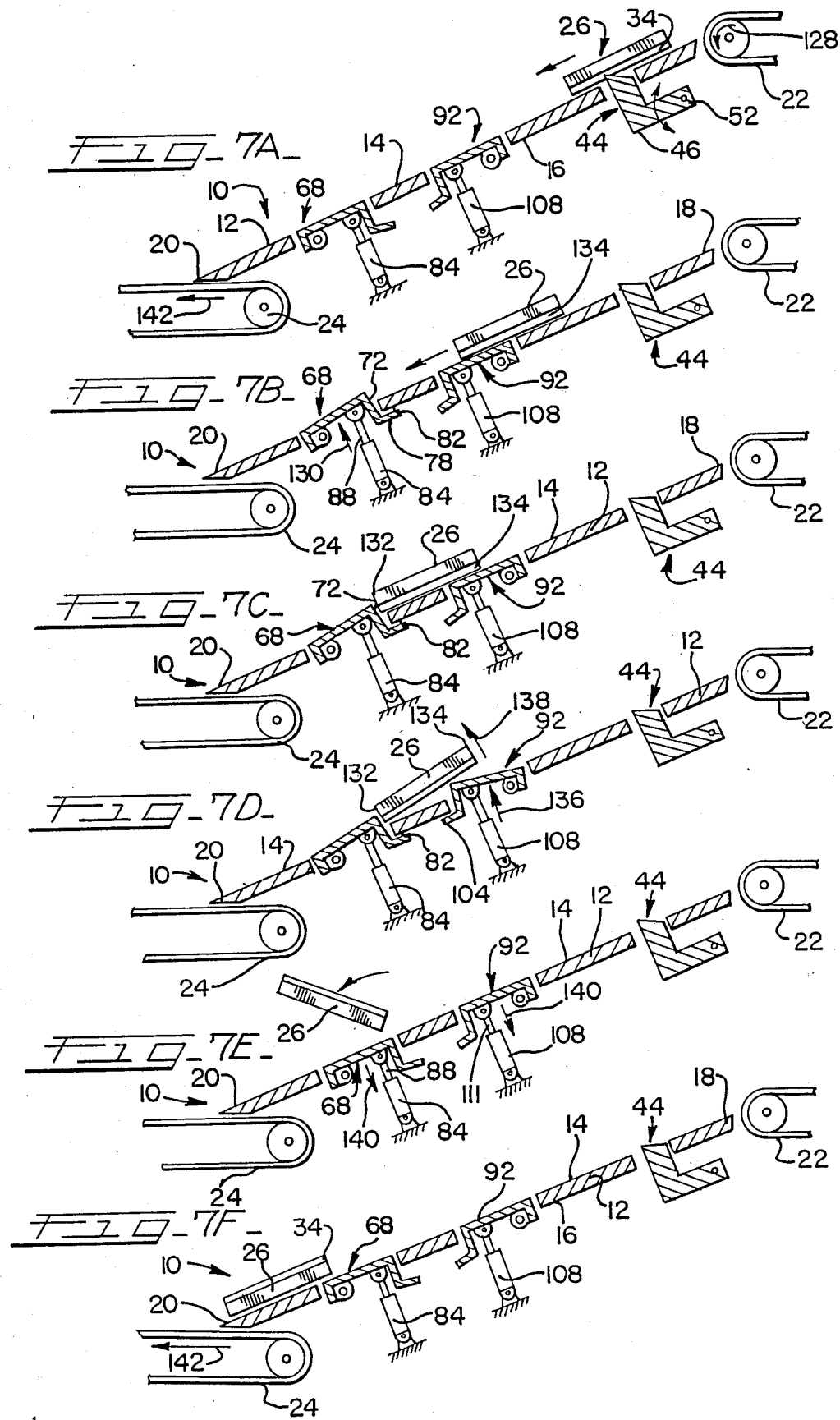

AUTOMATIC HIGH SPEED TIE PLATE REORIENTING MECHANISM

BACKGROUND OF THE INVENTION

The present invention relates to handling systems for conveyed articles having a detectable top and bottom, such as rail tie plates, and more specifically relates to a mechanism for the reorienting of the position of tie plates upon a conveyor surface.

The invention disclosed in the present application is related to the invention disclosed in copending application Ser. No. 203,328, filed June 7, 1988, titled "Method and Apparatus for Automatically Setting Rail Tie Plates", as well as my copending application Ser. No. 203,486, filed June 7, 1988, titled "Automatic Tie Plate Sorting Conveyor".

Tie plates are used to secure rails to railroad ties and comprise a generally flat steel plate with a substantially flat bottom, a plurality of spike holes located on opposite side ends of the plate, and an upper surface having a pair of transverse, parallel, vertically projecting rail-securing ribs or shoulders which define a rail seat therebetween. The tie plate upper surface is slightly angled to provide an inwardly canted rail seat, with more mass of the plate located on the field side thereof to compensate for the force distribution of trains negotiating curves at high speed.

In the process of reconditioning railroad rights-of-way, the existing rail is removed along with the spikes and tie plates, the ties are replaced or resurfaced, and the track bed is refurbished. Before new rails are laid, replacement or recycled tie plates must be accurately positioned upon the ties. Tie plate placement is a cumbersome and labor-intensive operation, due to the significant weight of the individual plates (18-40 lbs. each) and the rapid rate at which they must be positioned to keep up with the other operations of track reconditioning, most of which are largely automated.

Normally a member of a plate handling crew must retrieve steel plates individually from an often tangled pile and properly orient each plate for setting upon the upper surface of a tie to form new track beds. Two hands are required to position each plate due to their size and significant weight. If the plate is inverted, a worker must get his hands under the plate and turn it over. Typically, this is done on the ground or on a steel table surrounded by other plates and track material. Accurate plate placement upon the ties is critical, for the plates are required to be positioned within $\frac{1}{4}$ inch on an imaginary x-y plane parallel to the ground. The configuration of the plates is such that the vertically projecting ribs or shoulders must be facing upwardly and the planar bottom below for proper rail placement thereon. It has been estimated that a member of a plate setting crew will handle 150,000 pounds of plates per eight hour shift. In order for the manual plate setting operation to keep up with the other automatic track reconditioning operations of the rail gang for maximum efficiency, the workers must lay plates at the rate of 30 to 40 plates per minute. These conditions create a situation where operator fatigue and safety are major concerns.

Previous attempts at automating the tie plate setting operation resulted in devices largely concerned with the actual placement of the plates upon the ties. These prior art setters depended on a supply of plates which had already been manually oriented either on or off-site. On-site, the plates are often prepositioned upon the shoulder of the track bed, or carried in a gondola to be fed via conveyors to the plate setting device. In conventional plate handling processes, it is common to transfer plates from one location of the rail gang to another using inclined slide conveyors. However, the rapid rate of 30-40 plates per minute at which automatic tie plate setters must operate to keep up with other automated track maintenance equipment requires extensive preplacement and manual handling and sorting of plates.

Also, in commonly assigned U.S. Pat. No. 4,727,989, there is disclosed an automatic tie plate orientation sensing system which is designed to sense the orientation of plates upon a conveyed surface to determine whether or not the plates are inverted. The sensing system is also designed to transmit a signal upon the sensing of an improperly oriented or inverted plate. Consequently, there is a need for a tie plate handling mechanism which automatically inverts improperly oriented plates on a rapid basis and thus minimizes the operator's effort in properly orienting the position of tie plates. Such a mechanism would assist the plate setting operation in keeping up with other automated track repair and reconditioning equipment. Also, if the labor expended by a worker in flipping inverted plates could be alleviated, the operator fatigue factor would be significantly reduced.

Accordingly, the automatic high speed tie plate reorienting mechanism of the invention is designed to be triggered by a separate plate orientation sensing apparatus which determines whether a conveyed tie plate is in either the inverted or the properly oriented position. Once the plate reorienting mechanism is triggered by the plate orientation sensing system, the reorienting mechanism is designed to stop the conveyed travel of the plate and invert or flip the plate to be in proper orientation for placement upon the tie.

SUMMARY OF THE INVENTION

An automatic high speed tie plate reorienting mechanism is disclosed which is capable of rapidly reorienting conveyed tie plates upon the receipt of a triggering signal from a separate plate orientation sensing system. The invention operates between a non-activated mode, in which the reorienting hardware is retracted to allow properly oriented plates to slide down an inclined conveyor surface without any interference, and an activated mode, wherein upon the receipt of a signal from the plate orientation sensing system, the reorientation mechanism stops the transit of an individual plate down the conveyor and exerts an impulse of energy to an end of the stopped plate to impart angular momentum thereto, uprighting the plate with a flipping action and thus properly orienting the plate upon the conveyor surface. The stop and flipper devices then retract to allow additional, properly oriented plates to slide down the conveyor without interference or to prepare to rapidly reorient additional improperly oriented plates. Further, the invention is designed to operate or to invert plates at a rate of at least 30-40 plates per minute in order to keep up with other automated track reconditioning equipment.

BRIEF DESCRIPTION OF THE DRAWINGS

FIG. 1 is a diagrammatic sectional side view of an automatic tie plate sensing and reorienting apparatus, including the automatic tie plate reorienting mechanism of the invention;

FIG. 2 is a plan view of the apparatus depicted in FIG. 1;

FIG. 3 is a plan view of a conventional rail tie plate;

FIG. 4 is a front end elevational view of the plate depicted in FIG. 3;

FIG. 5 is a side end elevational view of the plate depicted in FIG. 3;

FIGS. 7A–7F are diagrammatic sectional side views of the apparatus depicted in FIG. 1 and chronologically depict a cycle of operation of that apparatus in stopping and inverting an improperly oriented rail tie plate.

DESCRIPTION OF THE PREFERRED EMBODIMENT

Figure 6:
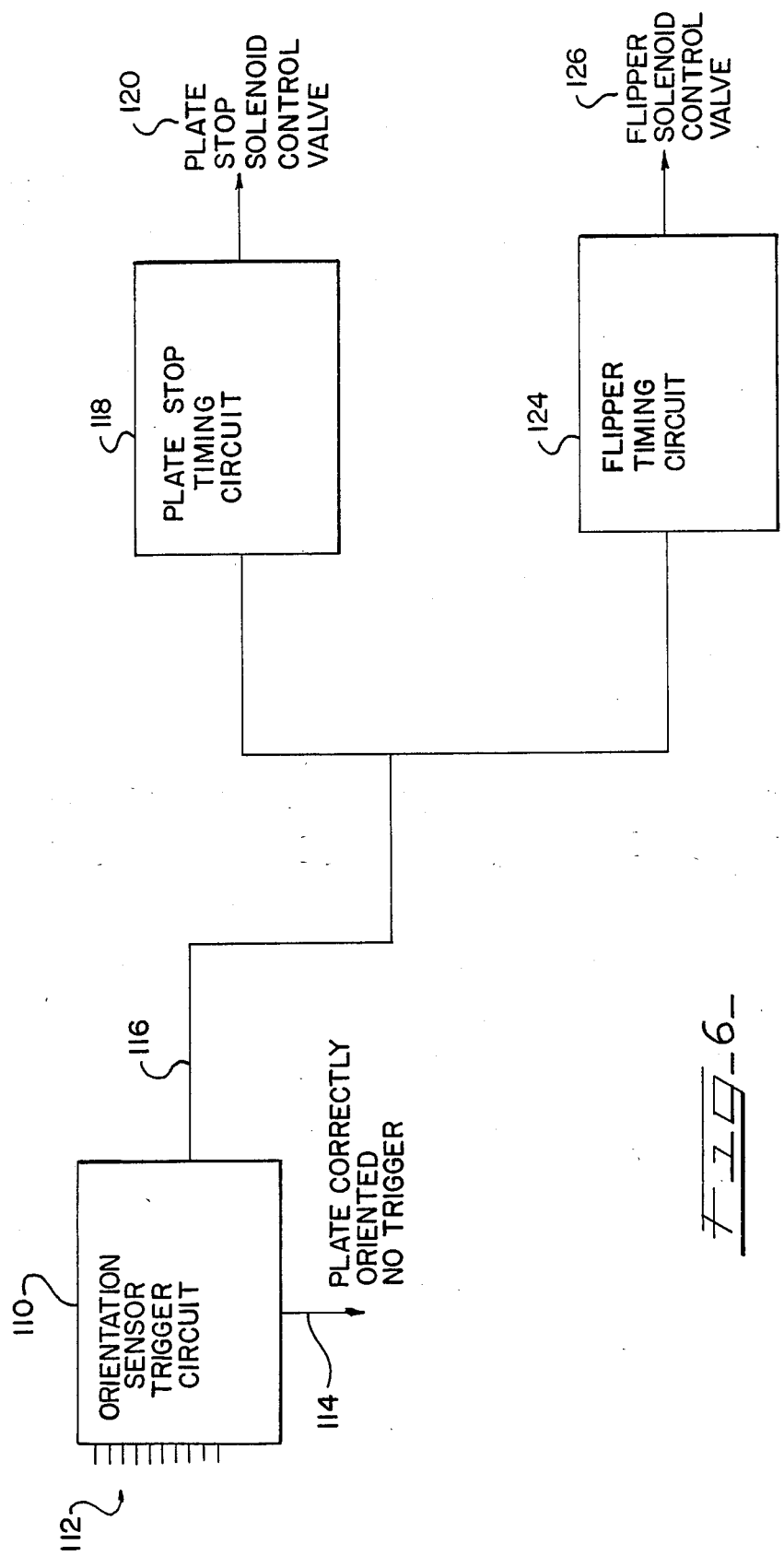
FIG. 6 is a block diagram schematic of the circuitry of the present invention.

Referring to the drawings, wherein like reference numerals represent like characteristics, FIG. 1 depicts a rail tie plate sensing and reorienting apparatus designated generally by the reference numeral 10. The apparatus 10 includes an inclined slide conveyor 12 having an upper surface 14, a lower surface 16, an upper end 18 and a lower end 20. The conveyor 12 is supported upon a frame (not shown) in its inclined position by conventional structural supports (not shown). An endless belt-type plate feed conveyor 22 is positioned adjacent the upper end 18 of the conveyor 12 so as to deliver a supply of conveyed plates seriatim to the upper end 18 of the conveyor 12. The conveyor 22 is preferably a plate sorting conveyor which is capable of delivering plates in proper length-to-width orientation described hereinbelow. Adjacent the lower end 20 of the conveyor 12, an endless belt-type plate take-up conveyor 24 is positioned to receive plates from the surface 12. The lower end 20 of the conveyor 12 may be beveled as shown to facilitate the transfer of plates to the take-up conveyor 24. A rail tie plate 26 is shown being conveyed upon the upper surface 14 of the inclined conveyor 12 and is shown in an inverted, improperly oriented position.

Referring now to FIGS. 3, 4 and 5, the configuration of a conventional rail tie plate 26 is shown in greater detail. The plate 26 includes a substantially flat body 28 having an upper surface 30 which is slightly canted to provide an inwardly canted rail seat 32 and which has more plate mass located on the field side 'F' thereof to compensate for the force distribution of trains negotiating curves at high speed. The rail seat 32 is defined by a pair of vertically projecting rail securing ribs or shoulders 34 which run transversely along the entire width of the plate 26. The plate 26 is further provided with a plurality of spike holes 36 which extend entirely through the body 28 and are positioned between the ribs 34 and the corresponding outer side edge margins 38 and 40, referred to as a "low side" 38 and a "high side" 40 (also referred to as field side 'F') as a result of the canted upper surface 30. In contrast to the upper surface 30, the lower surface 42 of the tie plate 26 is substantially planar for a flush fit upon rail ties.

Referring now to FIG. 1, although only one plate 26 is shown being conveyed on the surface 12, it is contemplated that a plurality of plates 26 will be supplied from the conveyor 22 in rapid succession at the rate of at least 30–40 plates per minute. The plate 26 is shown in proper length-to-width orientation, with the side edges 38 and 40 projecting transversely to the direction of travel of the plate 26 down the conveyor 12. In addition, the plate 26 is in the inverted position. This improper orientation of the plate is sensed by the plate orientation sensor 44. The sensor 44 is diagrammatically depicted, and is preferably of the configuration disclosed in commonly-assigned U.S. Pat. No. 4,727,989, although the use of equivalent orientation sensing devices is contemplated. In the preferred embodiment, the plate sensing apparatus 44 includes a plurality of sensing fingers 46 which are shown L-shaped and designed to project vertically through a corresponding transverse opening 48 in the conveyor 12. Each finger 46 is designed to reciprocally pivot upon an axis 52 in response to contact by a tie plate 26. The sensing fingers 46 are positioned in a spaced linear array in the transverse opening 48 (best seen in FIG. 2). In addition, the sensing fingers 46 are each provided with an opto switch (not shown) connected to control circuitry designed so that when a properly oriented plate passes over the fingers 46, a linear plurality thereof will be pivotally depressed and thus actuate a corresponding linear pattern of several of the opto switches. When an inverted plate 26 passes over the plate sensing apparatus 44, the plate is supported by the shoulders 34, thus only a relatively few fingers will be depressed, and a different pattern of activated opto switches will be triggered. The difference in the pattern of depressed fingers and activated opto switches will indicate to the control circuitry (best seen in FIG. 6) whether or not the plate 26 is improperly oriented and needs to be inverted.

A pair of upper and lower transverse openings, 54 and 56 respectively, are located in spaced relationship to each other in the inclined conveyor 12. The openings 54 and 56 extend substantially the entire width of the conveyor 12, which is bordered at each side edge thereof by the side rails 58 (best seen in FIG. 2). The opening 54 is further defined by upper and lower edge margins 60 and 62 of the conveyor 12 and the opening 56 is similarly further defined by upper and lower edge margins 64 and 66.

A stop member 68 is located in the lower transverse opening 56 and includes a substantially planar upper surface 70 as well as upper and lower depending edge walls 72, 74 respectively. The planar upper surface 70 is substantially coextensive with the opening 56. It will be readily seen that the upper depending edge wall 72 is provided with a greater height than is the wall 74. In the preferred embodiment, the upper depending edge wall 72 is also provided with a limiting flange 76 at its lower end 78 which projects laterally therefrom in the general direction of the upper end 18 of the conveyor 12. The stop member 68, including the upper surface 70, the depending wall 72 and 74 and the flange 76 are preferably integrally formed.

A transverse pivot bore 80 is secured to the underside of the planar surface 70 preferably in closely adjacent relationship to the lower depending edge wall 74 and extends substantially the entire length of the stop member 68. A pivot shaft (not shown) is designed to be journaled through the bore 80 and attached to the frame of the device 10 (not shown). Thus, the stop member 68 is adapted to pivot about the axis defined by the bore 80 between an extended position, wherein the upper depending edge wall 72 projects vertically above the upper surface 14 of the conveyor 12 as is shown in FIG. 1, and a retracted position wherein the surface 70 is substantially flush with the surface 14. The upward travel of the stop member 68 generally, and of the wall 72 specifically, is defined or limited by the impact of the flange 76 against the underside 16 of the conveyor 12 at the point 82. The wall 72 is preferably of sufficient height so that when in the fully extended position as shown in FIG. 1, a portion thereof arrests the downward slide of the plate 26 upon the upper surface 14. A fluid power cylinder 84 such as a hydraulic cylinder is connected at its base 86 to the frame of device 10 (not shown) and further is provided with a piston 88, the upper end of which is pivotally secured to the underside of the planar surface 70 by means of an eyelet 90. The eyelet 90 is located on the underside of the planar surface 70, preferably in close proximity to the upper wall 72 so as to exert optimum mechanical advantage over the pivoting action of the stop member 68. Thus, it will be seen that the hydraulic cylinder 84 is designed to control the reciprocal pivoting action of the stop member 68.

A flipper member 92 is located within the upper opening 54 and is substantially coextensive therewith in similar fashion to the positioning of the stop member 68 in the opening 56. The flipper member 92 includes a substantially planar surface 94 as well as lower and upper depending edge walls 96 and 98 respectively. The lower edge wall 96 is provided at its lower end 100 with a laterally projecting flange 102 which is generally directed toward the lower end 20 of the inclined conveyor 12. The flange 102 is provided with sufficient length to impact the underside 16 of the conveyor 12 at the point 104. A transverse pivot bore 106 is mounted to the underside of the planar surface 94 in closely adjacent relationship to the depending wall 98, and extends substantially the entire length of the flipper member 92. A pivot shaft (not shown) is designed to be journaled through the bore 106 and attached to the frame of the device 10 (not shown) in similar fashion to the bore 80, however, the pivot bores 80 and 106 are oriented at opposite ends of the respective members thereof so that the stop member 68 and the flipper member 92 are designed to pivot in opposing mirror-image relation to each other. It will be evident that a single configuration may be used for both the stop member 68 and the flipper member 92, the principal difference between the two being only the orientation thereof within the respective opening 56 or 54.

A fluid power cylinder 108 which is substantially similar to the fluid power cylinder 84 is mounted at a base end 109 to the frame (not shown). A piston 111 is mounted to an eyelet 113 attached to the underside of the planar surface 94 in close proximity to the depending wall 96. The cylinder 108 is adapted to control the reciprocal pivoting action of the flipper member 92. However, it will be readily seen that the flipper member 92 travels a vertical reciprocating path between an extended and a retracted position, in similar fashion to the stop member 68, however, in a mirror image relationship thereto. The upward vertical travel of the flipper member 92 is limited by the length of the lower edge depending wall 96 and the contact of the flange 102 with the point 104 of the surface 16.

Referring now to FIG. 6, a block diagram schematic of the control circuitry of the invention is depicted. The sensor fingers and attendant opto switches are connected to the orientation sensor trigger circuit 110 at the input points 112. The circuit 110 contains conventional components which analyze the pattern of inputs 112 to distinguish between a properly oriented plate, for which a plurality of sensor fingers are triggered, and an improperly oriented inverted plate 26, which will only trigger those sensor fingers 46 contacted by the plate shoulders 34. Thus, if a linear plurality of sensors 112 are triggered, the plate is determined to be properly oriented and no trigger impulse is transmitted from the circuit 110. This is diagrammatically depicted at point 114, and in such cases, the reorientation mechanism of the invention is in the retracted or non-activated mode. If, however, the pattern of tripped sensor fingers 46 as transmitted through the inputs 112 signals that a plate is improperly oriented or inverted, the circuit 110 is adapted to transmit a trigger signal through the line 116 to place the mechanism in the extended or activated mode. The trigger signal first activates the plate stop timing circuit 118, which includes a timing component programmed to account for the time required for the plate 26 to pass over the fingers 46 and reach the plate stop 68. Before the plate 26 reaches the stop member 68, the plate stop timing circuit 118 emits a trigger signal to a plate stop solenoid control valve 120 which in turn activates the hydraulic cylinder 84 to extend the stop member vertically above the surface 14 of the inclined conveyor 12. In this manner, the descent of the plate 26 down the conveyor 12 is arrested. The timing circuit 118 may alternatively be assisted by an electric eye 122 located in close proximity to the surface 14 (best seen in FIG. 1) in order to accurately monitor the position of the progress of the plate 26 upon the surface 14.

Once the cylinder 84 has been activated and the stop member 68 extended vertically, the plate 26 is stopped and the second phase of the flipping operation is ready to begin. The flipper timing circuit 124, which was also activated by the trigger signal 116, is provided with an internal clock component which allows the plate stop circuit 118 sufficient time to activate the elevation of the plate stop 68. As soon as the plate stop has been elevated, and the plate 26 stopped thereagainst, the flipper timing circuit 124 is adapted to emit a flipper trigger signal to the flipper solenoid control valve 126. The flipper solenoid control valve 126 controls the operation of the fluid power cylinder 108 to quickly thrust the flipper member 92 vertically upward, thus imparting an impulse to an end of the plate 26 to initiate a flipping motion thereof.

Referring now to FIGS. 7A–7F, the operation of the plate reorientation mechanism of the invention is shown in greater detail. Referring specifically to FIG. 7A, a tie plate 26 is shown having been deposited upon the surface 14 of the inclined conveyor 12 in inverted position by the endless conveyor 22, which is travelling in the direction indicated by the arrow 128. The plate 26 then begins its descent down the inclined conveyor 12 and its orientation is sensed by the plate orientation sensor 44. The sensor fingers 46 are depressed in a pattern corresponding to the depending shoulders 34. This sensed pattern triggers the circuit 110 to signal the plate stop and flipper timing circuits 118 and 124 respectively (best seen in FIG. 6). Prior to this point, and as long as properly oriented plates 26 are sensed by the sensor 44, the stop member 68 and the flipper member 92 are in their retracted positions, creating a substantially obstruction-free planar conveying surface to facilitate the descent of the plate 26 towards the lower end 20 of the inclined conveyor 12.

Referring to FIG. 7B, as the plate 26 descends, the timing clock portion of the circuit 118 determines the appropriate moment to energize the stop solenoid control valve 120 (best seen in FIG. 6) to extend the piston 88 of the hydraulic cylinder 84 in the direction indicated by the arrow 130. The stop member 68 is thus elevated until the limiting flange 78 reaches the point 82. In FIG. 7C, a first end 132 of the plate 26 is shown impacting the vertically projecting end wall 72 of the stop member 68. During the sequence represented by FIGS. 7A-7C, the flipper member 92 remains retracted and does not obstruct the descent of the plate 26.

Referring to FIG. 7D, once the flipper timing circuit 124 determines that it is appropriate to energize the flipper solenoid control valve 126 (best seen in FIG. 6), the cylinder 108 is pressurized and the plate flipper 92 is vertically extended. The cylinder 108 is specially adapted for rapid action, and as such, when energized, the upper surface 94 of the flipper member 92 imparts an impulse to the end 134 of the plate 26 opposite the end 132 of sufficient momentum to upright and invert the plate 26. This impulse is depicted in FIG. 7D by the arrows 136 and 138.

Referring to FIG. 7E, once the plate 26 is placed in motion through the action of the plate flipper member 92, both the flipper member 92 and the stop member 68 retract to be flush with the surface 14 of the inclined conveyor 12. This retraction is accomplished by the simultaneous and rapid retraction of the pistons 88 and 111 of the cylinders 84 and 108 in the direction indicated by the arrows 140.

Referring now to FIG. 7F, the plate 26 is shown after its inversion to a properly oriented position. At this point it has reached the lower end 20 of the conveyor surface 12, and is about to contact the endless plate take-up conveyor 24, upon which it will be transported in the direction indicated by the arrow 142 to supplemental plate handling apparatus (not shown) such as a plate setting mechanism. It has been found that the entire process of sensing the plate orientation and uprighting a 36 lb. plate using the above described mechanism takes less than 0.5 second.

While particular embodiments of this mechanism have been described, it will be obvious to persons skilled in the art that changes and modifications might be made without departing from the invention in its broader aspects.

What is claimed is:

1. A mechanism for inverting the sensed orientation of a conveyed article having a detectable top and bottom in a sequential arrangement of such articles, comprising:
   an inclined slide surface having an upper end and a lower end and adapted to receive the conveyed article at said upper end for descending travel thereupon;
   stop means pivotally and reciprocally associated with said surface and adapted to intercept the descent of the conveyed article upon said surface toward said lower end, said stop means having a vertically extended position for contacting a front end of the article; and
   flipper means pivotally and reciprocally associated with said surface and adapted to extend vertically to impact a rear end of the stopped article with sufficient force to rapidly flip the article past said stop means and toward said lower end of said slide surface, thus inverting the orientation of the article upon said surface.

2. The mechanism of claim 1 further including control means connected to said stop means and said flipper means and adapted to sequence the action of said stop means relative to said flipper means so as to effect inversion of the conveyed article.

3. The mechanism of claim 1 wherein said stop means is adapted for reciprocal vertical pivot movement relative to said surface.

4. The mechanism of claim 3 further including a fluid power cylinder connected to an underside of said stop means and adapted to control the vertical movement of said stop means.

5. The mechanism of claim 1 wherein said flipper means is adapted for reciprocal vertical pivot movement relative to said surface.

6. The mechanism of claim 5 further including a fluid power cylinder connected to an underside of said flipper means and adapted to control the vertical movement of said flipper means.

7. The mechanism as defined in claim 1 wherein said inclined surface is provided with upper and lower transverse openings, said stop means and said flipper means are positioned in said lower and upper openings respectively.

8. The mechanism as defined in claim 7 wherein said stop means and said flipper means each include a substantially planar surface with upper and lower edge margins corresponding to upper and lower ends of said respective opening and an end wall depending from each of said edge margins.

9. The mechanism of claim 8 wherein said upper end wall of said stop means is provided with limit means to limit the vertical pivot travel of said stop means.

10. The mechanism of claim 8 wherein said lower end wall of said flipper means is provided with limit means to limit the upward vertical pivot travel of said flipper means.

11. The mechanism of claim 8 wherein said stop means and said flipper means are each provided with a transverse pivot bore on respective undersides thereof.

12. The mechanism of claim 11 wherein said pivot bore is located on said stop means at a lower end of said underside thereof.

13. The mechanism as defined in claim 11 wherein said pivot bore on said flipper means is located thereon at an upper end of said underside thereof.

14. The mechanism of claim 2 further including sensing means adapted to sense the orientation of said conveyed articles and being connected to said control means for activation thereof.

15. The mechanism of claim 14 wherein said sensing means is adapted to activate said control means upon sensing inverted articles only.

16. An automatic mechanism for inverting the sensed orientation of a rail tie plate comprising:
   an inclined conveyor surface adapted so that a rail tie plate may slide thereon and having an upper end and a lower end, said surface having first and second transverse openings located on said surface in spaced parallel relationship to each other, each said opening being defined by corresponding upper and lower aperture edges of said surface, said second opening being located closer to said upper end than said first opening;
   a stop member designed to be substantially coextensive with said first opening and adapted to reciprocate between a retracted position and a vertically extended position, said stop member adapted to stop the descent of the plate when in said extended position;

a flipper member designed to be substantially coextensive with said second opening and adapted to reciprocate between a retracted position and a vertically extended position, said flipper member adapted to impact the stopped plate and invert same; and control means connected to said stop member and said flipper member and adapted to sequence the reciprocating action thereof so as to effect inversion of the conveyed tie plate.

17. The mechanism of claim 16 further including sensing means associated with said surface so as to sense the orientation of said conveyed article thereon.

18. The mechanism of claim 16 wherein said sensing means is adapted to activate said control means when an improperly oriented conveyed article is sensed.

19. The mechanism of claim 16 further including fluid pressure means adapted to actuate said flipper member and said stop member in said vertical reciprocal movement thereof.

20. The mechanism of claim 19 wherein said fluid pressure means includes a separate hydraulic cylinder associated with each of said flipper member and said stop member.

21. The mechanism of claim 20 wherein said hydraulic cylinders are connected to said control means.

22. The mechanism of claim 16 wherein said flipper member includes a substantially planar top surface having upper and lower end margins, each said end margin being provided with a corresponding depending wall.

23. The mechanism of claim 22 wherein said wall depending from said lower end margin is greater in height than said wall depending from said upper end margin.

24. The mechanism of claim 23 wherein said wall depending from said lower end margin is provided with limiting means to limit the upward travel of said flipper member.

25. The mechanism of claim 24 wherein said limiting means is a laterally projecting flange.

26. The mechanism of claim 16 wherein said stop member includes a substantially planar top surface having upper and lower end margins, each said end margin being provided with a corresponding depending wall.

27. The mechanism of claim 26 wherein said wall depending from said upper end margin is greater in height than said wall depending from said lower end margin.

28. The mechanism of claim 27 wherein said wall depending from said upper end margin is provided with limiting means to limit the upward travel of said stop member.

29. The mechanism of claim 28 wherein said limiting means is a laterally projecting flange.

30. A method for inverting conveyed articles having distinguishable top and bottom surfaces along an inclined conveyor surface comprising:

sensing the orientation of the articles on said surface;

stopping an improperly oriented article at a first end thereof by means of a pivoting stop member having a portion which pivotally projects vertically from said conveyor surface to contact the article; and flipping the stopped article by exerting sufficient force to a second end thereof using pivotable and reciprocable flipping means having a portion projecting vertically beyond said surface to cause the article to flip over said stop member and land on said surface in an inverted position.

31. The method of claim 30 further including retracting said stop means and said flipping means to be substantially flush with said surface once the article has been inverted.

* * * * *